(12) United States Patent
Komatsu et al.

(10) Patent No.: US 7,838,461 B2
(45) Date of Patent: Nov. 23, 2010

(54) CATALYST FOR EXHAUST GAS PURIFICATION

(75) Inventors: Tamikuni Komatsu, Tsukuba (JP); Keizou Tomokuni, Wako (JP)

(73) Assignees: Asahi Kasei Kabushiki Kaisha, Osaka (JP); The Noguchi Institute, Tokyo (JP)

( * ) Notice: Subject to any disclaimer, the term of this patent is extended or adjusted under 35 U.S.C. 154(b) by 613 days.

(21) Appl. No.: 11/261,502

(22) Filed: Oct. 31, 2005

(65) Prior Publication Data

US 2006/0094596 A1    May 4, 2006

Related U.S. Application Data

(60) Provisional application No. 60/623,337, filed on Nov. 1, 2004.

(51) Int. Cl.
*B01J 23/00* (2006.01)
*B01J 21/00* (2006.01)

(52) U.S. Cl. ........ 502/325; 502/235

(58) Field of Classification Search ........ None
See application file for complete search history.

(56) References Cited

U.S. PATENT DOCUMENTS

| 5,143,707 | A | * | 9/1992 | Beck et al. ........ 423/239.2 |
| 5,795,559 | A | * | 8/1998 | Pinnavaia et al. ........ 423/702 |
| 6,146,602 | A | * | 11/2000 | Narula et al. ........ 423/213.5 |
| 2006/0094596 | A1 | | 5/2006 | Komatsu |

FOREIGN PATENT DOCUMENTS

| DE | 19742344 A1 | | 4/1998 |
| EP | 0 533 312 A1 | | 3/1993 |
| JP | 5-503499 A | | 6/1993 |
| JP | 5-254827 A | | 10/1993 |
| JP | 6-509374 A | | 10/1994 |
| JP | 10151325 A | * | 6/1998 |
| JP | 2002-320850 A | | 11/2002 |
| JP | 2006-081957 A | | 3/2006 |
| WO | WO-91/11390 A2 | | 8/1991 |
| WO | WO-93/02159 A1 | | 2/1993 |

OTHER PUBLICATIONS

Ryong Ryoo, J.M. Kim, C.H. Ko, and C.H. Shin, Disordered Molecular Sieve with Branched Mesoporous Channel Network, J. Phys. Chem., 1996, 100, 17718-17721.*
Ryoo et al(Disordered Molecular Sieve with Branched Mesoporous Channel Network, J. Phys. Chem. 1996, 100, 17719-17721).*
Network. (2007,2000). In The American Heritage® Dictionary of the English Language. Retrieved from http://www.credoreference.com/entry/hmdictenglang/network.*
Jeon Jong Yeol et al: Appl. Catal. B Environ.: Applied Catalysis B: Environmental Sep. 8, 2003, vol. 44, No. 4, pp. 311-323, XP002395661.
Sobczak I et al: Microporous and Mesoporous Materials, Elsevier Science Publishing, New York, US vol. 78, No. 2-3, Mar. 1, 2005, pp. 103-116, XP004735958 ISSN: 1387-1811.
Chen Hang- Rong et al: J. Chem Eng. Jpn., Journal of Chemical Engineering of Japan Oct. 2003, vol. 36 No. 10, pp. 1212-1215, XP002395662.
Borodko Yuri et al: J Phys Chem B; Journal of Physical Chemistry B Sep. 22, 2005, vol. 109, No. 37, pp. 17386-17390, XP002395663.

* cited by examiner

*Primary Examiner*—Melvin C Mayes
*Assistant Examiner*—Michael Forrest
(74) *Attorney, Agent, or Firm*—Birch, Stewart, Kolasch & Birch, LLP

(57) ABSTRACT

A mesoporous catalyst for purifying lean burn NOx emission including a mesoporous material, which substantially has pores with a diameter of 2 to 50 nm and a specific surface area of 100 to 1,400 $m^2/g$, selected from the group consisting of mesoporous silica and mesoporous alumina, and 0.01 to 20 mass % of a catalyst carried on the mesoporous material with an average particle size of 1 to 20 nm containing platinum and/or iridium is provided.

11 Claims, No Drawings

CATALYST FOR EXHAUST GAS PURIFICATION

This Nonprovisional application claims priority under 35 U.S.C. §119(e) on U.S. Provisional Application No(s). 60/623,337 filed on Nov. 1, 2004, the entire contents of which are hereby incorporated by reference.

BACKGROUND OF THE INVENTION (1) Field of the Invention

The present invention relates to a mesoporous catalyst having a large specific surface area and a monolith catalyst comprising the mesoporous catalyst applied to gas channel inner walls of a monolith formed body. The use of the monolith catalyst of the present invention allows highly efficient purification treatment of NOx contained in lean burn vehicle exhaust gases.

(2) Description of the Related Art

The leading conventional three way catalyst (i.e., a catalyst containing three different metal atoms) for vehicle exhaust gas purification has a monolith body with cordierite as the catalyst support having gas channel inner walls. This three way catalyst further has a structure in which active alumina particles (with a size of several micrometers to several tens of micrometers) contain platinum-palladium-rhodium particles (with a size of several hundred nanometers to several micrometers) as the catalyst which are applied to the gas channel inner walls of the monolith body. The active alumina particles are an aggregate of microparticles with a size of several tens of nanometers to several hundred nanometers, and adsorbs the catalyst particles in the interstices between the microparticles. The interstice-type pore has a small spatial expanse (namely, planar), and is basically different from the through-hole pore structure (hereinafter referred also to as a pore channel) wherein the pore expands networkwise and is present in the synthetic zeolite and the mesoporous material used in the present invention. That is, the conventional catalyst particles do not have a structure wherein the catalyst particles are captured in three-dimensional pores.

The catalyst supported on a molecular sieve-like synthetic zeolite is generally referred to as a pore-supported catalyst, and then for distinguishing from this, conventional three way catalysts are, hereinafter, described as adsorption-supported catalysts. The three way catalyst is very effective for the exhaust gas treatment of gasoline vehicles, but is scarcely effective for the exhaust gas treatment of diesel vehicles running with gas oil fuel. In particular, the catalyst development to purify NOx emission at 150 to 200° C., which is emitted during transit is an unsolved problem also in the field of catalyst chemistry. Even at present, no practical catalyst for the diesel vehicle exhaust gas treatment is known. The major reason for this is the remarkable decrease in the activity of the above described three way catalysts in a relatively high concentration oxygen atmosphere of the diesel vehicle exhaust gas. Although the oxygen concentration in the gasoline vehicle exhaust gas is 1% or less, the oxygen concentration in the diesel exhaust gas is usually 5% or more because the air/fuel ratio of gas oil is more than several times that of gasoline. For gasoline vehicles, since the coexisting oxygen is controlled at 1% or less by burning at near the stoichiometric air/fuel ratio showing a stoichiometric mixing weight ratio of air to fuel, the combustion is referred to as rich burn; by contrast, in the diesel fuel combustion, since the intake air flow is largely in excess of the theoretical one, and the fuel supply amount is relatively small, the combustion is referred to as lean burn. This is because the three way catalyst is almost deactivated when the oxygen concentration becomes 5% under this combustion condition.

Generally, industrial catalysts are often used in the state of being supported on porous materials. The pores of porous materials are, according to IUPAC, classified into micropores of 2 nm or less in pore diameter, mesopores of 2 to 50 nm and macropores of 50 nm or more. No single porous material having a wide distribution ranging from micro to meso is known other than active carbon. Recently, silica, alumina and silica-alumina mesoporous molecular sieves have been developed which have the pore peak at a position of a few nanometers and a very large specific surface area of 400 to 1,100 $m^2/g$. The molecular sieves are disclosed, for example, in JP-A-5-254827, JP-A-5-503499 and JP-A-6-509374.

SUMMARY OF THE INVENTION

Since the catalyst reaction is a surface reaction, the larger specific surface area of the catalyst has the higher catalytic activity. Besides, the larger specific surface area of a support to support a catalyst more easily develops the catalytic activity. Upon looking at three way catalysts for vehicles from such a viewpoint, the specific surface area of a monolith formed body as a support is about 0.2 $m^2/g$, and the specific surface area of an alumina particle as an adsorbent is 110 to 340 $m^2/g$. Based on its particle size, the specific surface area of the catalyst can be estimated to be about 20 to 40 $m^2/g$. Therefore, it is expected to try to improve the catalyst activity for the diesel exhaust gas by applying a catalyst with an average particle size in the order of nanometers supported on a mesoporous material having a high specific surface area to a monolith formed body. (Hereinafter, a catalyst with an average particle size in the order of nanometers is referred to as nanocatalyst, and a pore-supported catalyst supporting a nanocatalyst in a mesoporous material is referred to as mesoporous catalyst. The surface area of the nanocatalyst is $10^2$ to $10^4$ times that of the three way catalyst.)

However, although a palladium catalyst supported on mesoporous silica simple substance is disclosed in JP-A-2002-320850 as an exhaust gas purification catalyst has a structure wherein a mesoporous catalyst is applied to a monolith formed body, a sufficient activity actually is not obtained.

An object of the present invention is, in view of the above described circumstances, to provide a novel catalyst which is remarkably efficient in conducting the purification treatment of NOx contained in the lean burn exhaust gas even at a low temperature, which is not conventionally achieved. Specifically, it is to provide a novel mesoporous catalyst exhibiting activity to the diesel NOx emissions even in a relatively high concentration oxygen atmosphere associated with a lean burn for efficiently purifying the diesel NOx emission, which is conventionally difficult, and to provide a monolith catalyst coated with the catalyst.

As the results of extensive studies to achieve the above described object, the present inventors have found that a catalyst in which a specified noble metal is supported on a mesoporous material having a specified pore distribution and a high specific surface area is very effective for lean burn NOx emission treatment, and have achieved the present invention based on this finding.

The present invention provides a mesoporous catalyst for purifying lean burn NOx emission characterized in that the catalyst comprises a mesoporous material that is poorly soluble, and comprises platinum or iridium particles supported on the mesoporous material, wherein 0.01 to 20 mass % of the catalyst are nanoparticles having an average particle size of 1 to 20 nm comprising platinum and/or iridium particles as the main catalyst supported on the mesoporous material, wherein the mesoporous material substantially has pores with a diameter of 2 to 50 nm and a specific surface area of 100 to 1,400 m$^2$/g, and is selected from the group consisting of mesoporous silica and mesoporous alumina, and provides a monolith catalyst comprising the mesoporous catalyst applied to gas channel inner walls of a monolith formed body.

That is, the present invention relates to the following 1 to 8.

1. A mesoporous catalyst for purifying lean burn NOx emission, comprising a mesoporous material, which substantially has pores with a diameter of 2 to 50 nm and a specific surface area of 100 to 1,400 m$^2$/g, selected from the group consisting of mesoporous silica and mesoporous alumina; and 0.01 to 20 mass % of a catalyst supported on the mesoporous material with an average particle size of 1 to 20 nm containing platinum and/or iridium.
2. The mesoporous catalyst according to the above described 1, wherein the above described mesoporous material is mesoporous silica which is a mesoporous metallosilicate in which 1 to 20 mol % of silicon constituting the mesoporous silica is substituted with at least one element selected from the group consisting of Group 3A elements including lanthanoid group elements, Group 3B elements, Group 4A elements, Group 5A elements and Group 6A elements in the periodic table.
3. The mesoporous catalyst according to the above described 2, wherein the above described element substituted for the silicon constituting the mesoporous silica is at least one selected from the group consisting of scandium, yttrium, cerium, lanthanum, samarium and gadolinium as the Group 3A elements, boron as the Group 3B element, titanium and zirconium as the Group 4A elements, niobium and tantalum as the Group 5A elements, and chromium, molybdenum and tungsten as the Group 6A elements.
4. The mesoporous catalyst according to the above described 3, wherein the above described element substituted for the silicon constituting the mesoporous silica is at least one selected from the group consisting of boron, tungsten, niobium and cerium.
5. The mesoporous catalyst according to the above described 3, wherein the above described element substituted for the silicon constituting the mesoporous silica is at least one selected from the group consisting of tungsten and cerium.
6. A monolith catalyst for purifying lean burn NOx emission obtained by applying a mesoporous catalyst described in any one of the above described 1 to 5 to gas channel inner walls of a monolith formed body.
7. The monolith catalyst according to the above described 6, wherein the above described mesoporous catalyst is applied to the above described monolith catalyst in an amount of 3 to 30 mass % of the monolith catalyst; platinum and/or iridium is supported on the mesoporous catalyst in an amount of 0.1 to 10 mass %; and platinum is supported in an amount of 0.03 to 3 mass % converted to per monolith catalyst.
8. A catalyst for NOx emission purification for small diesel vehicles which perform alternately the rich burn and the lean burn, using a monolith catalyst for purifying lean burn NOx emission according to the above described 6.
9. A catalyst for NOx emission purification for heavy duty diesel vehicles equipped with a urea supply system, using a monolith catalyst for purifying lean burn NOx emission according to the above described 6.

The mesoporous catalyst of the present invention can very efficiently conduct the lean burn NOx emission purification treatment at a low temperature, which cannot be conventionally achieved. For example, although a three way catalyst can scarcely purify nitrogen monoxide in the atmosphere of 14% in oxygen concentration, the platinum catalyst supported on a mesoporous tungstosilicate of the present invention can purify 80% or more of nitrogen monoxide coexisting in the atmosphere of 14% in oxygen concentration at 150 to 200° C.

DETAILED DESCRIPTION OF THE INVENTION

Hereinafter, the present invention will be described in detail.

One of features of the present invention is to use a mesoporous material as the support of a catalyst for the NOx purification. The reason is advantageous effects thereof, such as the strong capture of the catalyst because of the mesoporous material having through-hole type pores, the expectation of the gas diffusion effect through pore channels, the maintainability of the favorable particle size range of catalyst active species by control of the pore distribution, and the suppression of the catalyst particle reaggregation and uniform high dispersibility of the catalyst by supporting the catalyst in pores.

As described hereinafter, since the particle size of catalyst particles exhibiting a high activity to NOx is nano sized, the pore diameter of a mesoporous material as a support is nearly equal to that of catalyst particles. Since the catalyst particle size supported on pores of a mesoporous material is usually nearly equal to the pore diameter, a nanocatalyst having a favorable particle size can be uniformly dispersed and supported by controlling the pore diameter of the mesoporous material.

Therefore, the pore diameter and pore distribution of a mesoporous material is an important design element, and the specific surface area follows it. The pore diameter of a mesoporous material to support a nanocatalyst is in the range of substantially 2 to 50 nm, preferably in the range of 2 to 20 nm. Here referred to as "substantially with a diameter of 2 to 50 nm" is that the pore volume of pores with a diameter of 2 to 50 nm accounts for 60% or more of the total pore volume.

Supporting of a nanocatalyst having a pore diameter which is even less than 2 nm is possible, but is not preferred since the influence of contamination by impurities or the like is large. The pore diameter exceeding 50 nm is not preferable because the dispersed and supported nanocatalyst has a tendency to grow into very large particles by sintering under a high temperature hydrothermal conditions and the like.

The specific surface area is preferably as large as possible unless otherwise specified. The specific surface area of a mesoporous material usable in the present invention is 100 to 1,400 m$^2$/g, preferably 100 to 1,200 m$^2$/g, more preferably 400 to 1,200 m$^2$/g. With the specific surface area of less than 100 m$^2$/g, since the supported catalyst amount becomes less, the catalyst performance of a supported catalyst is not so large. The specific surface area exceeding 1,400 m$^2$/g is not preferable because a problem of material strength arises.

As a mesoporous material used in the present invention, a poorly soluble mesoporous material is used from the viewpoint of durability against a high temperature steam contained in exhaust gas. The degree of poor solubility of the material has practically no problem if in such a degree that the weight of extracted substances when a sample is placed in hot water of 150° C. for one hour is 0.01% or less.

Slightly soluble mesoporous materials include, for example, silica, alumina, titania, zirconia, yttria, ceria, niobia, silica-alumina and a composite material thereof, which all are mesoporous. Among these, silica, alumina, titania, zirconia, silica-alumina and a composite material thereof, which all are mesoporous, are preferable because of their relatively high mechanical properties. Further, among them, mesoporous silica and mesoporous silica-alumina are preferable, and mesoporous silica is especially preferable.

The mesoporous material composited with at least one element selected from the group consisting of Group 3A elements including the lanthanoid group elements, Group 3B elements, Group 4A elements, Group 5A elements and Group 6A elements is especially preferable because it is unexpectedly found to impart a low temperature activity to the catalyst.

As a Group 3A element, scandium, yttrium, lanthanum, cerium, samarium and gadolinium are preferable; as a Group 3B element, boron is preferable; as a Group 4A element, titanium and zirconium are preferable; as a Group 5A element, niobium and tantalum are preferable; and as a Group 6A element, chromium, molybdenum and tungsten are preferable.

Among them, boron, tungsten, niobium and cerium are further preferable, and tungsten and cerium are especially preferable.

The unexpected low-temperature activity mechanism in which the initiating temperature of the catalytic reaction by a mesoporous catalyst using the mesoporous material composited with these elements decreases by about 50 to 100° C. has yet to be determined, but is believed to relate to the NOx concentrating effect nearby the catalyst. The amount of these elements introduced is preferably 1 to 20 mol % to the main metal constituting the mesoporous material, more preferably 1 to 10 mol %.

Here, the above described mesoporous material composited with a Group 3A element, etc., means a composite structure in which a part of a metal in a metal oxide such as silica or alumina constituting the mesoporous material (e.g., silicon for silica) is substituted with an element such as the above described Group 3A element, etc.

The main catalyst used in the present invention is a catalyst containing noble metal nanoparticles of platinum and/or iridium.

Although the three way catalyst is conventionally known as the catalyst containing platinum for the vehicle exhaust gas treatment, this catalyst is known to have little effect on the diesel NOx emission purification treatment. The reason is that palladium and rhodium of constituting elements other than platinum is subject to the surface oxidation by low concentrations of oxygen. Since the three way catalyst is composed of platinum-palladium-rhodium, it easily deactivates once being subjected to surface oxidation.

The reason why the present invention uses platinum and/or iridium is that these noble metals have a high catalytic capability to oxidize nitrogen monoxide of the main component in the NOx emission by the coexisting oxygen into nitrogen dioxide, and are chemically stable even in a high temperature oxygen atmosphere. Moreover, since platinum has a relatively low-temperature activity among noble metals, and iridium has a relatively high-temperature activity, the catalyst reaction is achieved over a wide temperature range by use of a mixed catalyst of platinum and iridium.

Therefore, to enhance the low temperature activity more sufficiently than the high temperature activity, it is preferable to use platinum alone and support platinum in a larger amount.

Nitrogen dioxide produced by the catalytic reaction is easily decomposed into nitrogen and water by a reducing substance such as a lower olefin, a lower paraffin having 1 to 6 carbon atoms (contained in a fuel in a small amount) or urea in an ammonia form (mountable on a truck, etc.).

Since the surface area of catalyst particles is inversely proportional to the square of the particle size, the smaller catalyst particles have a higher catalytic activity. For example, the surface area of a catalyst particle of 1 nm is $10^4$ times larger than that of 0.1 µm. It is known that since catalyst particles micro-pulverized into nano sizes have plenty of high-order crystalline planes exhibiting activity such as edges, corners and steps, the catalytic activity is not only remarkably improved, but even an inactive metal which does not exhibit catalytic activity in its bulk state sometimes develops an unexpected catalytic activity. Therefore, although finer catalyst particles are more preferable in view of the catalytic capability, since, on the other hand, unfavorable properties such as the surface oxidation and side reactions due to micro-pulverization take place, an optimum range in particle size of the micro-particles exists.

The average particle size of catalyst particles exhibiting the effective activity on the NOx decomposing purification treatment of the object of the present invention is in the range of 1 to 20 nm, and the range of 1 to 10 nm is especially found to exhibit a high activity.

The catalyst of the present invention is a supported-type catalyst supported on pores of a mesoporous material. The amount of the catalyst containing platinum and/or iridium supported as the main catalyst is 0.01 to 20 mass %, preferably 0.1 to 10 mass %, but is usually used in several mass % if there is no problem in terms of the amount.

Any molar ratio of platinum to iridium is possible in a mixed catalyst. If they are equimolar, a high activity is usually achieved over a low to high temperature. When the low temperature activity takes precedence, the platinum ratio is favorably increased, and when the high temperature activity takes precedence, the iridium ratio is favorably increased. Although the amount of the catalyst supported on the mesoporous material can exceed 20 mass %, it is not economical because the catalyst in pore depths which scarcely contribute to the reaction increases when the supporting amount is excessive. By contrast, if the amount of the catalyst supported is less than 0.01 mass %, the activity is not sufficient.

By adding a promoter component having different functions to the platinum and/or iridium catalysts as the main catalysts of the present invention, the catalyst performance through a synergistic effect can be improved. Examples of such a component include chromium, manganese, iron, cobalt, nickel, copper, zinc, barium, scandium, yttrium, titanium, zirconium, hafnium, niobium, tantalum, molybdenum, tungsten, lanthanum, cerium, barium, and a compound thereof. Among them, preferable are chromium, iron, cobalt and nickel, which make a passivation film, copper which can, relative to the others, highly adsorb a reducing agent, barium oxide which has the NOx occluding property, cerium oxide and manganic oxide, which can moderately oxidize, copper-zinc, iron-chromium and molybdenum oxide, which are effective for preventing SOx poisoning, and the like. The amount of the component added is usually about 1 to 100 times of the main catalyst on a mass basis, but may be optionally as small as 1/10 to 1/100 time.

The synthesizing method of a mesoporous material of the present invention is not especially limited, and a desired material can be fabricated using conventional methods.

For example, it is fabricated according to a conventional method (e.g., the above described JP-A-5-254827, JP-A-5-503499 and JP-A-6-509374) using a surfactant as a template for mesopores.

In this method, a metal alkoxide is generally used for a precursor of a mesoporous material. As a surfactant, any of the conventional micelle-forming surfactants used for fabricating the conventional mesopore molecular sieves can be used, for example, a long chain quaternary ammonium salt, a long chain alkylamine-N-oxide, a long chain sulfonate salt, a polyethylene glycol alkyl ether and a polyethylene glycol fatty acid ester. As a solvent, at least one of water, alcohols and diols is generally used. Among them, water and hydrophilic solvents such as alcohols such as methanol, ethanol and propanol are preferable. The addition of a small amount of a compound having the coordination capability to a metal in the reaction system remarkably enhances the stability of the reaction system. As such a stabilizer, a compound having the metal coordination capability, such as acetylacetone, tetramethylenediamine, ethylenediaminetetraacetic acid, pyridine and picoline, is preferable. The composition of the reaction system composed of a precursor, a surfactant, a solvent and a stabilizer is as follows: the molar ratio of the precursor is 0.01 to 0.60, preferably 0.02 to 0.50; the molar ratio of the precursor/the surfactant is 1 to 30, preferably 1 to 10; the molar ratio of the solvent/the surfactant is 1 to 1,000, preferably 5 to 500; and the molar ratio of the stabilizer/the main material is 0.01 to 1.0, preferably 0.2 to 0.6.

The reaction temperature is in the range of 20 to 180° C., preferably 20 to 100° C. The reaction time is in the range of 5 to 100 h, preferably 10 to 50 h. The reaction product is generally separated by filtration, washed fully with water, and dried, and then, the contained surfactant is extracted with an organic solvent such as an alcohol, and calcined at a high temperature of 500 to 1,000° C. to remove it completely, thus obtaining a mesoporous material.

A mesoporous material containing with a Group 3A element, a Group 3B element, a Group 4A element, a Group 5A element and/or a Group 6A element can be fabricated by the similar method to the above-described fabrication method of the mesoporous material by adding a precursor substance of the mesoporous material with an alkoxide, acetylacetonate, etc., of these elements in an appropriate amount.

The mesoporous catalyst of the present invention can be fabricated, for example, by the ion exchange method or the impregnation method. Although these two methods have differences in depositing of the catalyst on the support where the ion exchange method utilizes the ion exchange ability of the support surface, and the impregnation method utilizes the capillary action the support has, their basic processes are almost the same. That is, the mesoporous material is immersed in an aqueous solution of a catalyst precursor, and thereafter filtrated, dried, and optionally washed with water, and reduced with a reducing agent, thereby fabricating a mesoporous catalyst.

As a platinum catalyst precursor, for example, $H_2PtCl_4$, $(NH_4)_2PtCl_4$, $H_2PtCl_6$, $(NH_4)_2PtCl_6$, $Pt(NH_3)_4(NO_3)_2$, $Pt(NH_3)_4(OH)_2$, $PtCl_4$, and platinum acetylacetonate can be used. As an iridium catalyst precursor, for example, $H_2IrCl_4$, $(NH_4)_2IrCl_4$, $H_2IrCl_6$, $(NH_4)_2IrCl_6$, $IrCl_4$, and iridium acetylacetonate can be used.

As a material for a promoter component optionally added to the main catalyst, for example, aqueous salts such as chlorides, nitrates, sulfates, carbonates and acetates of the metals as the above described promoter components can be used.

A co-supported catalyst of platinum and iridium can be fabricated similarly by mixing the catalyst precursors for both.

A catalyst comprising a promoter component added to platinum and/or iridium is also fabricated similarly by mixing the main catalyst precursors with the promoter component precursor.

As a reducing agent, hydrogen, an aqueous hydrazine solution, formalin, etc. can be used. The reduction can be conducted under typical conditions known for a corresponding reducing agent. For example, the hydrogen reduction can be conducted by placing a sample in a hydrogen gas flow diluted with an inert gas such as helium, and treating usually at 300 to 500° C. for several hours. After the reduction, heat treatment may optionally be conducted in an inert gas flow at 500 to 1,000° C. for several hours.

The monolith formed body of the present invention means a formed body whose cross section is mesh-like and which is provided with gas channels parallel in the axial direction with each partitioned by thin walls. The external shape of a formed body is not especially limited, but usually cylindrical. The monolith catalyst of the present invention means a catalyst in which a mesoporous catalyst is applied to the gas channel inner walls of the monolith formed body. The mesoporous catalyst is applied in an amount of preferably 3 to 30 mass %. It is unfavorable if applied in an amount exceeding 30%, since the gas will only slowly diffuse to the catalyst inside the support. If the concentration is less than 3%, then insufficient catalytic performance is provided. The amount of the catalyst adhered corresponding to the amount of the catalyst applied to the monolith formed body is preferably 0.03 to 3 mass % of the formed body.

The monolith catalyst of the present invention can be fabricated according to the fabrication method of a monolith formed body in which a three way catalyst for vehicles is adhered. For example, a slurry of usually 10 to 50 mass % is prepared by making a mixture in which a mesoporous catalyst and colloidal silica as the binder are mixed in a mass ratio of usually 1:(0.01 to 0.2), and dispersing the mixture in water; thereafter the slurry is adhered to gas channel inner walls of a monolith formed body by immersing the monolith formed body in the slurry; and the resultant is dried, and heat treated in an inert atmosphere such as nitrogen, helium or argon at 500 to 1,000° C. for several hours, thereby fabricating the monolith catalyst.

As a binder other than colloidal silica, a methylcellulose, an acrylic resin, a polyethylene glycol, etc., may be optionally used. A monolith catalyst can be fabricated also by an alternative method in which a monolith formed body is coated with a mesoporous material, which is then impregnated with a catalyst precursor, and the resultant is reduction treated and heat treated. The thickness of a mesoporous catalyst layer applied to a formed body is preferably usually 1 μm to 100 μm, especially preferably in the range of 10 μm to 50 μm. If the thickness exceeds 100 μm, the reaction gas is slowly diffused, undesirably. If less than 1 μm, the degradation of the catalyst performance is undesirably accelerated.

The monolith catalyst of the present invention, when mounted on vehicles, especially on diesel vehicles, can remarkably and effectively purify the lean burn NOx emitted by the vehicles over a wide temperature range of 150 to 700° C. Although a reducing agent is necessary for the NOx emission treatment, since, in the case of small vehicles like passenger cars, a lower olefin and a lower paraffin having 1 to 6 carbon atoms contained in a small quantity in gas oil of the fuel become the reducing agents, the fuel is supplied to the catalyst directly or through a reformer. Since the oxygen concentration is low in the rich burn, and the oxygen concentration is high in the lean burn, the use of the monolith catalyst of the present invention for the exhaust gas purification treatment of small diesel vehicles which can perform alternately the rich burn and the lean burn enables the efficient NOx emission purification treatment over a wide range of 150 to 700° C. Further, in the case of heavy duty diesel vehicles like trucks, since a system can usually be utilized in which ammonia as the reducing agent is made to generate by decomposing urea water, and supplied to the catalyst, the monolith catalyst can be used also as a catalyst for NOx emission purification of heavy duty diesel vehicles mounting the urea supply system.

Hereinafter, the present invention will be specifically illustrated by way of examples.

The powder X-ray diffraction pattern in examples was measured by a RINT2000 X-ray diffractometer manufactured by Rigaku Corp. The average particle size of a catalyst was determined through the direct observation using a transmission electron microscope, and was confirmed to agree with a value calculated by substituting the half band width of the main peak of the powder X-ray diffraction pattern into the Sheller equation. The specific surface area and pore distribution were measured by a Sorptomatic 1800 Analyzer manufactured by Carlo Erba by using nitrogen as the adsorption/desorption gas. The specific surface area was determined by the BET method. The pore distribution was measured for the range of 1 to 200 nm, and shown on a differential distribution determined by the BJH method. Many of synthesized mesoporous materials exhibited a peak at the position of a specific pore diameter in a distribution ascending exponentially toward the left. This peak is, for convenience, referred to as the "pore peak". The thermal analysis for examining the crystallinity of the material and the residual surfactant was conducted at a temperature rising rate of 20° C.min$^{-1}$ using a DTA-50 thermal analyzer manufactured by Shimadzu Corp. As a model gas of the vehicle NOx emission, helium-diluted nitrogen monoxide, oxygen and a reducing gas (ethylene or ammonia) was used. The content of NOx contained in the gas after the treatment was quantitatively analyzed according to the zinc reduction naphthylethylenediamine method (JISK 0104) described below to determine the nitrogen monoxide treatment ratio.

Operation Method

A reaction gas is sampled in a Tedlar bag. A gas-tight syringe is inserted in the Tedlar bag containing the reaction gas to sample 20 ml of the reaction gas.

A 100 ml round-bottomed flask with a three-way cock is depressurized, and the whole reaction gas in the gas-tight syringe is introduced thereinto. 20 ml of 0.1 N aqueous ammonia is added to the round-bottomed flask, and the mixture is allowed to stand for one hour. 1 ml of a solution of 1 g of sulfanilamide in a 10% aqueous hydrochloric acid solution is added, stirred for about 30 sec, and the mixture is allowed to stand for 3 min. To this, 1 ml of a solution of 0.1 g of N-(1-naphthyl)ethylenediamine dihydrochloride in 100 ml of distilled water is added, and the mixture is stirred for about 30 sec and allowed to stand for 20 min. The resultant liquid is put in a quartz cell (cell length 10 mm), and measured for the absorbance of 540 nm. The reaction ratio of nitrogen monoxide is determined by the following expression (1).

[Expression 1]

$$[1-(\text{absorbance of gas after reaction/absorbance of gas before reaction})] \times 100(\%) \quad (1)$$

COMPARATIVE EXAMPLE 1

Synthesis of Comparative Sample

An aqueous solution of 0.215 g of $PtCl_4.5H_2O$, 0.106 g of $PdCl_2.2H_2O$ and 0.162 g of $Rh(NO_3)_3.2H_2O$ in 20 ml of distilled water is put in an evaporating dish. 10 g of γ-alumina (microparticles with a particle size of 2 to 3 μm) was added to the solution, and the mixture was evaporated to dryness in a steam bath, and thereafter vacuum-dried at 100° C. for 3 h in a vacuum drier. The resultant sample was put in a quartz tube, and reduced in helium-diluted hydrogen gas (10% v/v) flow at 500° C. for 3 h, thus synthesizing a catalyst having a noble metal content of about 2 wt %. This was used as a noble metal catalyst simulating a three way catalyst in the comparative experiment.

EXAMPLE 1

Synthesis of Platinum/Mesoporous Silica Catalyst 300 g of distilled water, 240 g of ethanol and 30 g of dodecylamine were put and dissolved in a 1 L beaker. 125 g of tetraethoxysilane was added to the solution while stirring, and the mixture was stirred at room temperature for 22 h.

The reaction product was filtrated, washed with water, dried in hot air at 110° C. for 5 h, and thereafter calcined in air at 550° C. for 5 h to decompose and remove the contained dodecylamine, thus obtaining a crystalline mesoporous silica material.

As the results of the pore distribution and specific surface area measurements, the material had a pore peak at the position of about 3.2 nm, a specific surface area of 933 m$^2$/g, a pore volume of 1.35 cm$^3$/g, and the volume occupied by pores of 2 to 50 nm was 1.34 cm$^3$/g. It was also found to be crystalline silica by the X-ray diffractometry.

An aqueous solution of 0.267 g of $H2PtCl_6.6H_2O$ in 20 g of distilled water was put in an evaporating dish. 5 g of the above described mesoporous silica material was added to the solution, and the mixture was evaporated to dryness in a steam bath, and thereafter vacuum-dried at 100° C. for 3 h in a vacuum drier. The resultant sample was put in a quartz tube, and reduced in helium-diluted hydrogen gas (10 v/v %) flow at 500° C. for 3 h, thus synthesizing a mesoporous catalyst with a platinum content of about 2 mass %. The average particle size of the platinum particles supported on the mesoporous catalyst was about 3.0 nm.

EXAMPLE 2

Synthesis of Iridium/Mesoporous Silica Catalyst

An aqueous solution of 0.175 g of $H_2IrCl_4$ in 20 g of distilled water was put in an evaporating dish. 5 g of the mesoporous silica material of Example 1 was added to the solution, and the mixture was evaporated to dryness in a steam bath, and thereafter vacuum-dried at 100° C. for 3 h in a vacuum drier. The resultant sample was put in a quartz tube, and reduced in helium-diluted hydrogen gas (10 v/v %) flow at 500° C. for 3 h, thus synthesizing a mesoporous catalyst with an iridium content of about 2 mass %. The average particle size of the iridium particles supported on the mesoporous catalyst was about 3.0 nm.

EXAMPLE 3

Synthesis of Platinum/Mesoporous Alumina Catalyst 300 g of distilled water, 240 g of ethanol and 30 g of dodecylamine were put and dissolved in a 1 L beaker. 120 g of triisopropoxyaluminum was added to the solution while stirring, and the mixture was stirred at room temperature for 22 h. The reaction product was filtrated, washed with water, dried in hot air at 110° C. for 5 h, and thereafter calcined in air at 550° C. for 5 h to decompose and remove the contained dodecylamine, thus obtaining a crystalline mesoporous alumina material. As the results of the pore distribution and specific surface area measurements, the material had a pore peak at the position of about 3.2 nm, a specific surface area of 870 m²/g, a pore volume of 1.32 cm³/g, and the volume occupied by pores of 2 to 50 nm was 1.28 cm³/g. It was also found to be crystalline alumina by the X-ray diffractometry.

Using 5 g of this material, a mesoporous catalyst with a platinum content of about 2 mass % was synthesized by the method similar to Example 1.

EXAMPLE 4

Synthesis of Platinum/Mesoporous Borosilicate Catalyst 300 g of distilled water, 240 g of ethanol and 30 g of dodecylamine were put and dissolved in a 1 L beaker. 112 g of tetraethoxysilane and 5.4 g of trimethoxyborane were added to the solution while stirring, and the mixture was stirred at room temperature for 22 h. Thereafter, the reaction product was filtrated, washed with water, dried in hot air at 100° C. for 5 h, and thereafter calcined in air at 550° C. for 5 h to decompose and remove the contained dodecylamine, thus obtaining a mesoporous borosilicate material. The material was found to be a borosilicate having a Si/B molar ratio of about 10 by the X-ray diffractometry. As the results of the pore distribution and specific surface area measurements, the material had a pore peak at the position of about 2.7 nm, a specific surface area of 1,132 m²/g, a pore volume of 0.92 cm³/g, and the volume occupied by pores of 2 to 50 nm was 0.80 cm³/g. Using 5 g of this material, a mesoporous catalyst with a platinum content of about 2 mass % was synthesized by the method similar to Example 1.

EXAMPLE 5

Synthesis of Platinum-Iridium/Mesoporous Borosilicate Catalyst

An aqueous solution of 0.134 g of $H_2PtCl_6 \cdot 6H_2O$ and 0.125 g of $H_2IrCl_4$ in 20 g of distilled water was put in an evaporating dish. 5 g of the mesoporous borosilicate material of Example 3 was added to the solution, and the mixture was evaporated to dryness in a steam bath, and thereafter vacuum-dried at 100° C. for 3 h in a vacuum drier. The resultant sample was put in a quartz tube, and reduced in helium-diluted hydrogen gas (10 v/v %) flow at 500° C. for 3 h, thus synthesizing a mesoporous catalyst with platinum and iridium contents of about 1 mass % each.

EXAMPLE 6

Synthesis of Platinum/Mesoporous Titanosilicate Catalyst 300 g of distilled water, 240 g of ethanol and 30 g of dodecylamine were put and dissolved in a 1 L beaker. 124.8 g of tetraethoxysilane and a solution of tetraethoxytitanium in ethanol (a solution of 9.1 g of tetraethoxytitanium in 5 g of ethanol) was added to the solution while stirring, and the mixture was stirred at room temperature for 22 h. Thereafter, the reaction product was filtrated, washed with water, dried in hot air at 100° C. for 5 h, and thereafter calcined in air at 550° C. for 5 h to decompose and remove the contained dodecylamine, thus obtaining a mesoporous titanosilicate material. The material was found to be a titanosilicate having a Si/Ti molar ratio of about 10 by the X-ray diffractometry. As the results of the pore distribution and specific surface area measurements, the material had a pore peak at the position of about 2.6 nm, a specific surface area of 710 m²/g, a pore volume of 0.60 cm³/g, and the volume occupied by pores of 2 to 50 nm was 0.56 cm³/g. Using 5 g of this material, a mesoporous catalyst with a platinum content of about 2 mass % was synthesized by the method similar to Example 1.

EXAMPLE 7

Synthesis of Platinum/Mesoporous Tungstosilicate Catalyst 300 g of distilled water, 240 g of ethanol and 30 g of dodecylamine were put and dissolved in a 1 L beaker. 99.6 g of tetraethoxysilane and an aqueous solution of ammonium tungstate (a solution of 17.87 g of ammonium tungstate pentahydrate in 40 g of distilled water) were added to the solution while stirring, stirred at room temperature for 22 h. Thereafter, the reaction product was filtrated, washed with water, dried in hot air at 100° C. for 5 h, and thereafter calcined in air at 550° C. for 5 h to decompose and remove the contained dodecylamine, thus obtaining a mesoporous tungstosilicate material. The material was found to be a tungstosilicate having a Si/W molar ratio of about 10 by the X-ray diffractometry. As the results of the pore distribution and specific surface area measurements, the material had a pore peak at the position of about 3.0 nm, a specific surface area of 830 m²/g, a pore volume of 0.65 cm³/g, and the volume occupied by pores of 2 to 50 nm was 0.60 cm³/g. Using 5 g of this material, a mesoporous catalyst with a platinum content of about 2 mass % was synthesized by the method similar to Example 1.

EXAMPLE 8

Synthesis of Platinum/Mesoporous Niobium Silicate Catalyst 150 g of distilled water, 120 g of ethanol and 30 g of dodecylamine were put and dissolved in a 1 L beaker. 62 g of tetraethoxysilane and a solution of pentaethoxyniobium in ethanol (a solution of 9.5 g of pentaethoxyniobium in 5 g of ethanol) were added to the solution while stirring, and the mixture was stirred at room temperature for 22 h. Thereafter, the reaction product was filtrated, washed with water, dried in hot air at 100° C. for 5 h, and thereafter calcined in air at 550° C. for 5 h to decompose and remove the contained dodecylamine, thus obtaining a mesoporous niobium silicate material. The material was found to be a niobium silicate having a Si/Nb molar ratio of about 10 by the X-ray diffractometry. As the results of the pore distribution and specific surface area measurements, the material had a pore peak at the position of about 2.5 nm, a specific surface area of 757 m²/g, a pore volume of 0.63 cm³/g, and the volume occupied by pores of 2 to 50 nm was 0.60 cm³/g. Using 5 g of this material, a mesoporous catalyst with a platinum content of about 2 mass % was synthesized by the method similar to Example 1.

EXAMPLE 9

Synthesis of Platinum/Mesoporous Cerium Silicate Catalyst 300 g of distilled water, 240 g of ethanol and 30 g of dodecylamine were put and dissolved in a 1 L beaker. 124 g of tetraethoxysilane and a solution of tetraethoxycerium in ethanol (a solution of 19.05 g of tetraethoxycerium in 20 g of ethanol) were added while stirring, and the mixture was stirred at room temperature for 22 h. Thereafter, the reaction product was filtrated, washed with water, dried in hot air at 100° C. for 5 h, and thereafter calcined in air at 550° C. for 5 h to decompose and remove the contained dodecylamine, thus obtaining a mesoporous cerium silicate material. The material was found to be cerium silicate having a Si/Ce molar ratio of about 10 by the X-ray diffractometry. As the results of the pore distribution and specific surface area measurements, the material had a pore peak at the position of about 3.2 nm, a specific surface area of 850 m²/g, a pore volume of 0.68 cm³/g, and the volume occupied by pores of 2 to 50 nm was 0.65 cm³/g. Using 5 g of this material, a mesoporous catalyst with a platinum content of about 2 mass % was synthesized by the method similar to Example 1.

EXAMPLE 10

Synthesis of Monolith Catalyst 1 g of the catalyst of Example 1 and 0.1 g of colloidal silica were added to 10 ml of distilled water, and the solution was stirred to prepare a slurry. In this slurry, five pieces of mini-formed bodies (21 cells; diameter 8 mm×length 9 mm; weight 0.15 g) cut out from a commercial cordierite monolith formed body (400 cells/in²; diameter 118 mm×length 50 mm; weight 243 g) were immersed, and taken out, dried in air, and treated in a nitrogen flow at 500° C. for 3 h. The amount of the mesoporous catalyst adhered was about 10 wt % of the mini-formed body, and the platinum supporting amount per mini-formed body was about 0.2 mass %.

EXAMPLE 11

NOx Treatment Using Ethylene as the Reducing Agent

A quartz-made continuous flow reaction tube was filled with 0.3 g each of catalyst samples of Comparative Example and Examples, and nitrogen monoxide (with a concentration adjusted with helium) was made to flow through the tube for treating. The component molar concentration of the gas to be treated was 0.1% for nitrogen monoxide, 14% for oxygen, 10% for steam and 0.3% for ethylene. The flow rate of the mixed gas introduced into the reaction tube was 100 ml per minute, and the treatment temperature was 100 to 350° C. The exhaust gas was sampled at every additional temperature of 50° C., and the purification treatment ratio of nitrogen monoxide was determined. The results are shown in Table 1.

From Table 1, it is found that the mesoporous catalysts of the present invention can purify NOx coexisting with a high concentration oxygen efficiently even at a low temperature by using a hydrocarbon such as ethylene as the reducing agent. In particular, the platinum catalyst and the platinum-iridium catalyst supported on the mesoporous tungstosilicate permit the efficient NOx purification unprecedently at 150 to 200° C. Therefore, it is found to be suitable for the NOx emission treatment of small diesel vehicles.

EXAMPLE 12

0.3 g each of the catalysts of Example 4 and Example 10 was used for treating nitrogen monoxide. The component molar concentration ratio of the gas to be treated was 0.1% for nitrogen monoxide, 1% for oxygen and 1% for ethylene. The flow rate of the adjusted gas was 100 ml per minute, and the treatment temperature was 100 to 600° C. NOx contained in the exhaust gas after the treatment was quantitatively analyzed to determine the purification treatment ratio of nitrogen monoxide. The results are shown in Table 2.

From Table 2, it is found that the mesoporous catalysts of the present invention can purify NOx in a rich burn condition efficiently over a middle temperature to a high temperature by using a hydrocarbon as the reducing agent. Therefore, since, if the rich burn and the lean burn are alternately performed, for example, the catalysts of Example 4 and Example 10 can remove NOx over a wide temperature range, the catalysts are found to be suitable for the NOx emission treatment of small diesel vehicles which can perform alternately the lean burn and the rich burn.

EXAMPLE 13

NOx Treatment Using Ammonia as the Reducing Agent

Nitrogen monoxide was treated using 0.3 g of the catalyst of Example 2. The component molar concentration ratio of the gas to be treated was 0.1% for nitrogen monoxide, 14% for oxygen, 10% for steam and 0.3% for ammonia. The flow rate of the adjusted gas was 100 ml per minute, and the treatment temperature was 100 to 600° C. NOx contained in the exhaust gas after the treatment was quantitatively analyzed to determine the purification treatment ratio of nitrogen monoxide. The results are shown in Table 3.

From Table 3, it is found that the mesoporous catalyst of the present invention can purify NOx coexisting with a high concentration oxygen efficiently also by using ammonia as the reducing agent. Therefore, the catalyst is found to be suitable for NOx emission purification treatment of heavy duty diesel vehicles mounting a urea supply system as the ammonia source.

TABLE 1

| | 150° C. | 200° C. | 250° C. | 300° C. | 350° C. |
|---|---|---|---|---|---|
| Catalyst of Comparative Example 1 Pt—Pd—Rh/γ-alumina | 0% | 5% | 20% | 30% | 20% |
| Catalyst of Example 1 Pt/Mesoporus silica | 34% | 95% | 84% | 77% | 65% |
| Catalyst of Example 2 Ir/Mesoporus silica | 20% | 57% | 94% | 75% | 64% |
| Catalyst of Example 3 Pt/Mesoporus alumina | 32% | 97% | 78% | 63% | 51% |
| Example 4 Pt/Mesoporus borosilicate | 82% | 97% | 84% | 80% | 66% |
| Example 5 Pt—Ir/Mesoporus borosilicate | 66% | 93% | 92% | 87% | 65% |
| Example 6 Pt/Mesoporus titanosilicate | 15% | 91% | 82% | 78% | 67% |
| Example 7 Pt/Mesoporus tungstosilicate | 54% | 98% | 86% | 77% | 69% |
| Example 8 Pt/Mesoporus niobium silicate | 39% | 96% | 86% | 79% | 72% |
| Example 9 Pt/Mesoporus cerium silicate | 52% | 97% | 85% | 82% | 70% |
| Example 10 Pt/Mesoporus silica/Monolith | 30% | 93% | 82% | 75% | 63% |

TABLE 2

|  | 150° C. | 200° C. | 250° C. | 300° C.~350° C. |
|---|---|---|---|---|
| Example 4 Pt/Mesoporus borosilicate | 0% | 7% | 82% | 97% |
| Example 10 Pt/Mesoporus silica/ Monolith | 0% | 5% | 80% | 97% |

TABLE 3

|  | 150° C. | 200° C. | 300° C. | 400° C. | 500° C. | 600° C. |
|---|---|---|---|---|---|---|
| Example 2 Pt/Mesoporus alumina | 95% | 95% | 95% | 95% | 88% | 80% |

The invention claimed is:

1. A monolith catalyst for purifying lean burn NOx emission obtained by applying a mesoporous catalyst to gas channel inner walls of a monolith formed body,
wherein the mesoporous catalyst comprises a mesoporous material and at least one of platinum and iridium, wherein the mesoporous material is a member selected from the group consisting of mesoporous borosilicate, mesoporous tungstosilicate, mesoporous niobosilicate, and mesoporous ceriumsilicate;
wherein the respective amount of boron, tungsten, niobium, and cerium in the mesoporous borosilicate, mesoporous tungstosilicate, mesoporous niobosilicate and mesoporous ceriumsilicate is 1 to 20 mol % of the amount of silicon in the mesoporous material;
and the mesoporous material substantially has pores with a diameter of 2 to 50 nm and a specific surface area of 100 to 1,400 m²/g, and has a through-hole pore structure expanding networkwise, and wherein 0.01 to 20 mass % of the mesoporous catalyst are nanoparticles of at least one of platinum and iridium having an average particle size of 1 to 20 nm as the main catalyst supported on the mesoporous material,
wherein the catalyst has a NOx purification ratio of at least 39% at a temperature of 150° C.

2. The monolith catalyst according to claim 1, wherein the mesoporous catalyst is applied to the monolith catalyst in an amount of 3 to 30 mass % of the monolith catalyst; platinum and/or iridium is supported on the mesoporous catalyst in an amount of 0.1 to 10 mass %; and platinum and/or iridium is supported in an amount of 0.03 to 3 mass % converted to per monolith catalyst.

3. A catalyst for purifying NOx emission for small diesel vehicles which perform alternately the rich burn and the lean burn, using a monolith catalyst for purifying lean burn NOx emission according to claim 1.

4. A catalyst for purifying NOx emission for heavy duty diesel vehicles equipped with a urea supply system, using a monolith catalyst for purifying lean burn NOx emission according to claim 1.

5. A catalyst for purifying NOx emission for small diesel vehicles which perform alternately the rich burn and the lean burn, using a monolith catalyst for purifying lean burn NOx emission according to claim 2.

6. A catalyst for purifying NOx emission for heavy duty diesel vehicles equipped with a urea supply system, using a monolith catalyst for purifying lean burn NOx emission according to claim 2.

7. A mesoporous catalyst for purifying lean burn NOx emission, comprising a mesoporous material and at least one of platinum and iridium,
wherein the mesoporous material is a member selected from the group consisting of mesoporous borosilicate, mesoporous tungstosilicate, mesoporous niobosilicate, and mesoporous ceriumsilicate;
wherein the respective amount of boron, tungsten, niobium, and cerium in the mesoporous borosilicate, mesoporous tungstosilicate, mesoporous niobosilicate and mesoporous ceriumsilicate is 1 to 20 mol % of the amount of silicon in the mesoporous material;
and the mesoporous material substantially has pores with a diameter of 2 to 50 nm and a specific surface area of 100 to 1,400 m²/g, and has a through-hole pore structure expanding networkwise, and wherein 0.01 to 20 mass % of the mesoporous catalyst are nanoparticles of at least one of platinum and iridium having an average particle size of 1 to 20 nm as the main catalyst supported on the mesoporous material,
wherein the catalyst has a NOx purification ratio of at least 39% at a temperature of 150° C.

8. A method of purifying lean burn NOx emission comprising contacting a monolith catalyst according to claim 1 or 2 and a reducing agent with a lean burn exhaust gas.

9. The method of claim 8, wherein said reducing agent is selected from lower paraffin having 1 to 6 carbon atoms or ammonia.

10. The method of purifying lean burn NOx emission according to claim 8, wherein said method is carried out in a temperature ranging from 150° C. to 700° C.

11. The method of purifying lean burn NOx emission according to claim 9, wherein said method is carried out in a temperature ranging from 150° C. to 700° C.

* * * * *